United States Patent Office 3,297,762
Patented Jan. 10, 1967

3,297,762
SEPARATING AMMONIA FROM TRIMETHYLAMINE
Erich Haarer and Reinhold Plass, Ludwigshafen (Rhine), Germany, assignors to Badische Anilin- & Soda-Fabrik Aktiengesellschaft, Ludwigshafen (Rhine), Germany
No Drawing. Filed Sept. 9, 1963, Ser. No. 307,316
Claims priority, application Germany, Sept. 12, 1962, B 68,811
7 Claims. (Cl. 260—583)

This invention relates to a process for separating a mixture of ammonia and trimethylamine into its components.

In the reaction of methyl alcohol or dimethyl ether with ammonia, a mixture of monomethylamine, dimethylamine, and trimethylamine is obtained. When this mixture is distilled, an azeotropically boiling mixture of ammonia and trimethylamine is obtained after ammonia has been added.

It is known to separate an azeotropically boiling mixture of ammonia and trimethylamine of this type by adding a further substance which forms with ammonia an azeotrope having a lower boiling point than with trimethylamine.

Another method for separating a mixture of trimethylamine and amonia makes use of different basicities of ammonia and trimethylamine. After a weak acid has been added to this mixture, the more strongly basic trimethylamine remains in solution in the form of the corresponding salt while the ammonia escapes in gaseous form.

It is also known to separate a mixture containing ammonia and trimethylamine into its components by passing in water under pressure at elevated temperature so that the trimethylamine escapes as a gas and the ammonia dissolves in water.

It is furthermore known to carry out the separation of trimethylamine from a mixture containing aqueous ammonia and trimethylamine by passing the mixture into a system of two liquids which are not miscible with each other and one of which preferentially dissolves the ammonia while the other preferentially dissolves the trimethylamine.

These methods have the disadvantage however that considerable amounts of extraneous substances are brought into contact with the mixture to be separated and these extraneous substances must then be separated in a troublesome way from the trimethylamine to be recovered.

In accordance with this invention these objects are accomplished and mixtures consisting essentially of 15 to 85% by weight of ammonia and of 80 to 12% by weight of trimethylamine are separated by carrying out the steps of (a) cooling the mixtures to $-55°$ to $-85°$ C. and (b) adding 0.5 to 6% by weight of water to the mixture in optional sequence and separating at said temperature the resulting two layers from each other.

The preferred range of temperature for carrying out the process is between $-65°$ and $-85°$ C. The water may be added to the mixture of trimethylamine and ammonia prior to the cooling. The mixture may however be cooled to the said temperature range first and the water then added. The amount of water used is 0.5 to 6% by weight with reference to the mixture of ammonia and trimethylamine. If less water is added, phase separation is often less satisfactory. If more water is added, phase separation admittedly is satisfactory, however there has to be accepted the need for removing the higher water content in the ammonia phase prior to recycling the ammonia to the methylation reaction. For this reason, it is advantageous to add 0.5 to 6% by weight, preferably 0.5 to 1.5% by weight, of water.

Mixtures of trimethylamine and ammonia in which the ammonia content of the mixture is between 15 and 85% by weight and the trimethylamine content is between 80 and 12% by weight may be separated by the process according to the invention. The mixture may also contain small amounts, for example 3 to 5% by weight, of monomethylamine and dimethylamine as impurities. It is preferred to use the process according to the invention for mixtures of trimethylamine and ammonia which boil azeotropically. Such azeotropically boiling mixtures are obtained for example by distilling a mixture of ammonia, monomethylamine, dimethylamine and trimethylamine which has been obtained by methylation of ammonia with methanol or dimethyl ether. The composition of the azeotropically boiling mixture of ammonia and trimethylamine depends on the pressure at which the separation of the monomethylamine and dimethylamine has been carried out. Thus for example the azeotropically boiling mixture at a pressure of 17 a.t.m. contains 14% by weight of trimethylamine and at a pressure of 10 a.t.m. contains 25% by weight of trimethylamine.

The invention is further illustrated by the following examples in which the parts specified are parts by weight.

Example 1

100 parts of a mixture consisting of 82.5 parts of ammonia, 16.8 parts of trimethylamine, 0.2 part of monomethylamine and 0.5 part of dimethylamine is cooled to $-72°$ C. 1.5 parts of water is added to the cooled mixture. After the mixture has stood for a short time, two layers form and these are separated. The lower layer consists of 82.2 parts of ammonia, 4.9 parts of trimethylamine, 0.4 part of dimethylamine, 0.2 part of monomethylamine and 1.5 parts of water. 99.65% by weight of the ammonia is contained in this layer.

The upper layer consists of 0.3 part of ammonia, 0.1 part of dimethylamine and 11.9 parts of trimethylamine, i.e., 71% by weight of the trimethylamine contained in the initial mixture. The trimethylamine obtained in this way may be purified by conventional methods. If it is distilled, a first runnings containing 0.3 part of ammonia, 0.05 part of trimethylamine and 0.05 part of dimethylamine passes over first. This fraction may be returned to the low temperature separation. 11.85 parts of trimethylamine of 99.6% purity remains in the still.

Example 2

100 parts of a mixture consisting of 72 parts of trimethylamine, 26 parts of ammonia, 1 part of monomethylamine and 1 part of dimethylamine has 1 part of water added to it. The whole is then cooled to $-68°$ C. Two layers form and are separated. The lower layer consists of 7 parts of trimethylamine, 21 parts of ammonia, 0.5 part of monomethylamine, 0.5 part of dimethylamine and 1 part of water. The upper layer contains 65 parts of trimethylamine, 5 parts of ammonia, 0.5 part of dimethylamine and 0.5 part of monomethylamine. The upper layer may be further purified by distillation as described in Example 1.

Example 3

100 parts of a mixture consisting of 55 parts of ammonia, 43 parts of trimethylamine, 1 part of monomethylamine and 1 part of dimethylamine has 3 parts of water added to it. The mixture is cooled to $-62°$ C. Two layers form. The lower layer consists of 51 parts of ammonia, 8 parts of trimethylamine, 0.5 part of monomethylamine, 0.5 part of dimethylamine and 3 parts of water. The upper layer consists of 35 parts of trimethylamine, 4 parts of ammonia, 0.5 part of monomethylamine and 0.5 part of dimethylamine. This layer may be further purified by distillation, as described in Example 1.

Example 4

100 parts of a mixture consisting of 80.5 parts ammonia, 18.7 parts of trimethylamine, 0.5 parts of monomethylamine and 0.3 part of dimethylamine are cooled to −74° C. and then 4 parts of water are added. Two layers form. The lower layer consists of 79.5 parts of ammonia, 0.3 part of monomethylamine, 0.1 part of dimethylamine, 5.6 parts of trimethylamine and 4 parts of water. The upper layer consists of 13.1 parts of trimethylamine, 1 part of ammonia, 0.2 part of monomethylamine and 0.2 part of dimethylamine. This layer may be further purified by distillation, as described in Example 1.

We claim:

1. A process for separating the individual components from a mixture consisting essentially of 15 to 85% by weight of ammonia and of 80 to 12% by weight of trimethylamine which comprises (a) cooling the mixture to −55° to −85° C. and (b) adding 0.5 to 6% by weight of water to the mixture and separating at said temperature the resulting two layers from each other.

2. A process as claimed in claim 1 in which said mixture is cooled in step (a) to −65° to −85° C.

3. A process as claimed in claim 1 wherein the amount of water added in step (b) is 0.5 to 1.5% by weight.

4. A process as claimed in claim 2 wherein the amount of water added in step (b) is 0.5 to 1.5% by weight.

5. A process as claimed in claim 1 wherein the mixture is one which boils azeotropically.

6. A process as claimed in claim 1 wherein said water is added to said mixture before it is cooled in step (a).

7. A process as claimed in claim 1 wherein said water is added to said mixture after it is cooled to −55° to −85° C.

No references cited.

CHARLES B. PARKER, *Primary Examiner.*

R. L. RAYMOND, *Assistant Examiner.*